(12) United States Patent
Case

(10) Patent No.: US 7,057,770 B2
(45) Date of Patent: Jun. 6, 2006

(54) NONE-OF-THE-ABOVE DIGITAL HALFTONE COMPRESSION AND DECOMPRESSION

(76) Inventor: Robert M. Case, 2205 Potters Creek Rd., Canyon Lake, TX (US) 78133

( * ) Notice: Subject to any disclaimer, the term of this patent is extended or adjusted under 35 U.S.C. 154(b) by 0 days.

(21) Appl. No.: 10/354,728

(22) Filed: Jan. 30, 2003

(65) Prior Publication Data

US 2004/0150683 A1 Aug. 5, 2004

(51) Int. Cl.
*B41B 15/00* (2006.01)
*G06K 9/36* (2006.01)

(52) U.S. Cl. .............. 358/1.9; 358/426; 358/261.1; 382/245

(58) Field of Classification Search .......... 347/15, 347/43, 41; 358/1.2, 1.9, 426, 261.1, 534, 358/261.3, 518, 54; 382/232, 233, 245; 375/253
See application file for complete search history.

(56) References Cited

U.S. PATENT DOCUMENTS 5,991,340 A 11/1999 Isomura ............... 375/253
6,608,928 B1 * 8/2003 Queiroz ................ 382/173
6,741,368 B1 * 5/2004 Hoel .................... 358/1.9

OTHER PUBLICATIONS

Villarreal, "Quality and Compressibility Analysis of Checker Board–Based Digital Halftoning Algorithms" Thesis, Master of Science in Computer Science, Southwest Texas State University, 2002, pp. 57–60.

* cited by examiner

*Primary Examiner*—Lamson D Nguyen

(57) ABSTRACT

An improved method of encoding and compressing digital halftones that utilizes a "none-of-the-above" method for designating variable-length runs. A monochrome input bitmap is rearranged slightly to reduce the patterns possible in contained digital halftone cells. This revised monochrome bitmap is parsed into subfiles to optimize run-lengths. The parsed subfiles are combined into a single file whose alternating runs of 1's and 0's are converted into successive variable-length binary numbers. One of the permutations of an antecedent binary is designated "none-of-the-above" and its use triggers a subsequent variable-length binary. All other permutations within each variable-length binary may designate a specific contained run-length and such use triggers a return to the initial binary in the series. The above method is reversed to decode and uncompress the encoded file to reproduce the original revised monochrome bitmap for display by a computer monitor or printer.

1 Claim, 7 Drawing Sheets

NONE-OF-THE-ABOVE DIGITAL HALFTONE COMPRESSION AND DECOMPRESSION

FEDERALLY SPONSORED RESEARCH

Not Applicable.

SEQUENCE LISTING OR PROGRAM

Not Applicable.

1. Background—Field of Invention

My invention relates to digital halftone compression and decompression, specifically to delineating variable-length runs using a "none-of-the-above" method 2. Background—Description of Prior Art Digital halftone files have proven to be quite diffcult to compress. Within the monochrome bitmap, each picture element, or pixel, is designated one of two "colors," usually black or white. Due to the complexity of the image to be reproduced, the probability of any individual pixel being one color or the other is 50-50. This unpredictability affects the production of "runs," large groups of pixels of the same "color." Common compression methods based on run-length encoding prove inefficient, occasionally yielding "compressed" files even larger than the original input file.

Presently the digital halftone industry works around this problem by waiting until the last minute to create the monochrome bitmap. Complex image files utilizing a number of different file formats are compressed, stored or transmitted, and decompressed prior to being "rasterized" into a digital halftone file at the final output stage, the digital printer or monitor display.

OBJECT AND ADVANTAGES

Several objects and advantages of the present invention are:

(a.) to encode and compress a monochrome bitmap into a smaller binary file that my be efficiently stored or transmitted.

(b.) to decode and decompress this smaller binary file into a reproduction of the original monochrome bitmap that then may be displayed on a digital computer monitor or printer.

(c.) to store and transmit as a single file complex documents previously consisting of two or more different file formats.

(d.) to accomplish the above efficiently by means of a digital computer.

SUMMARY

According to the present invention, a digital halftone efficiently is compressed for storage or transmission, and then efficiently decompressed for display on a digital computer monitor or printer.

DRAWINGS

Drawing Figures

DETAILED DESCRIPTION

Figure 1:
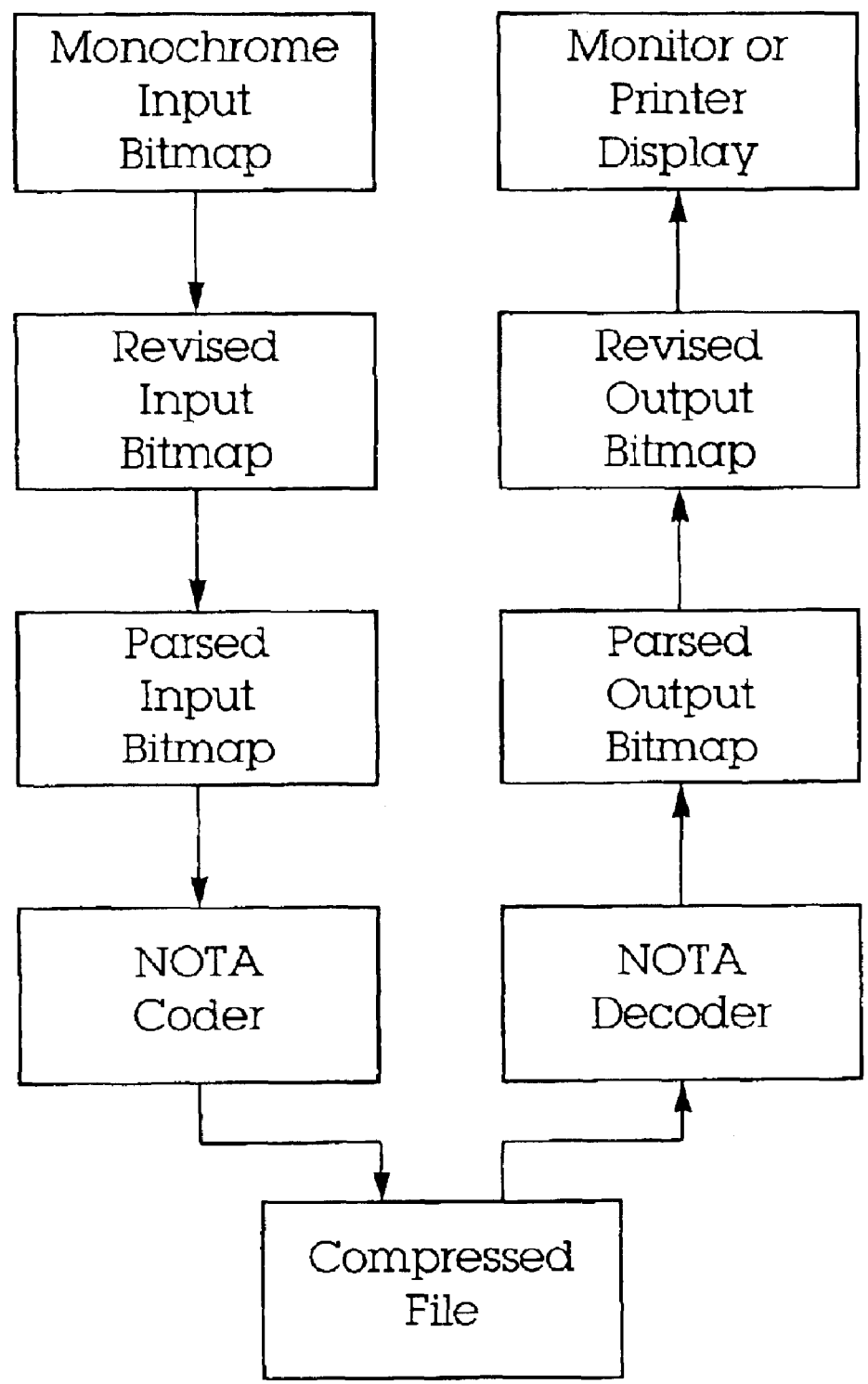
FIG. 1 shows a flow chart of the method of the invention as performed by a binary computing device.

Description—FIG. 1—Flow Chart

A Monochrome Input Bitmap contains an input image's pixels displayed at a binary depth of one bit. Each pixel is described by either a 0 or a 1 to designate one of two "colors," normally black or white. This bitmap is of certain dimensions in pixels high and wide, and a number of equal-sized multi-pixel halftone cells are contained wholly within.

A Revised Input Bitmap is derived by slightly rearranging the black and white pixels in each of the Monochrome Input Bitmap's contained two-pixel-by-two-pixel halftone cells to reduce the number of possible patterns. This pattern reduction maintains the ratio of black pixels to white pixels, or gray level, within the cell.

A Parsed Input Bitmap is derived by dividing the pixels within each contained two-pixel-by-two-pixel halftone cell into two or more separate bitmaps that maintain the spatial relationship of each pixel to similarly positioned pixels within the. cell. These separate bitmaps then are combined into a global bitmap containing the same number of pixels as its predecessor and the same ratio of black pixels to white pixels, or global gray level.

A "none or the above" or NOTA Coder then acts on this Parse Input Bitmap to yield a binary file that is smaller than that used to describe the preceding bitmaps.

Following retrieval of this file, a NOTA Decoder then acts to reverse the coding process and yield an exact duplicate of the Parsed Input Bitmap, now redesignated a Parsed Output Bitmap. This bitmap contains the same number of pixels and the same ratio of black pixels to white pixels as the Revised Input Bitmap but not in the same order.

A Revised Output Bitmap is derived by reversing the previous parsing method to yield a bitmap that is an exact duplicate of the Revised Input Bitmap, including the same number of global pixels and the same ratio of black pixels to white pixels within each two-by-two-pixel cell. This bitmap then is sent to a binary computer's Monitor or Printer Display.

FIGS. 2–5—Preferred Embodiment

Figure 2:
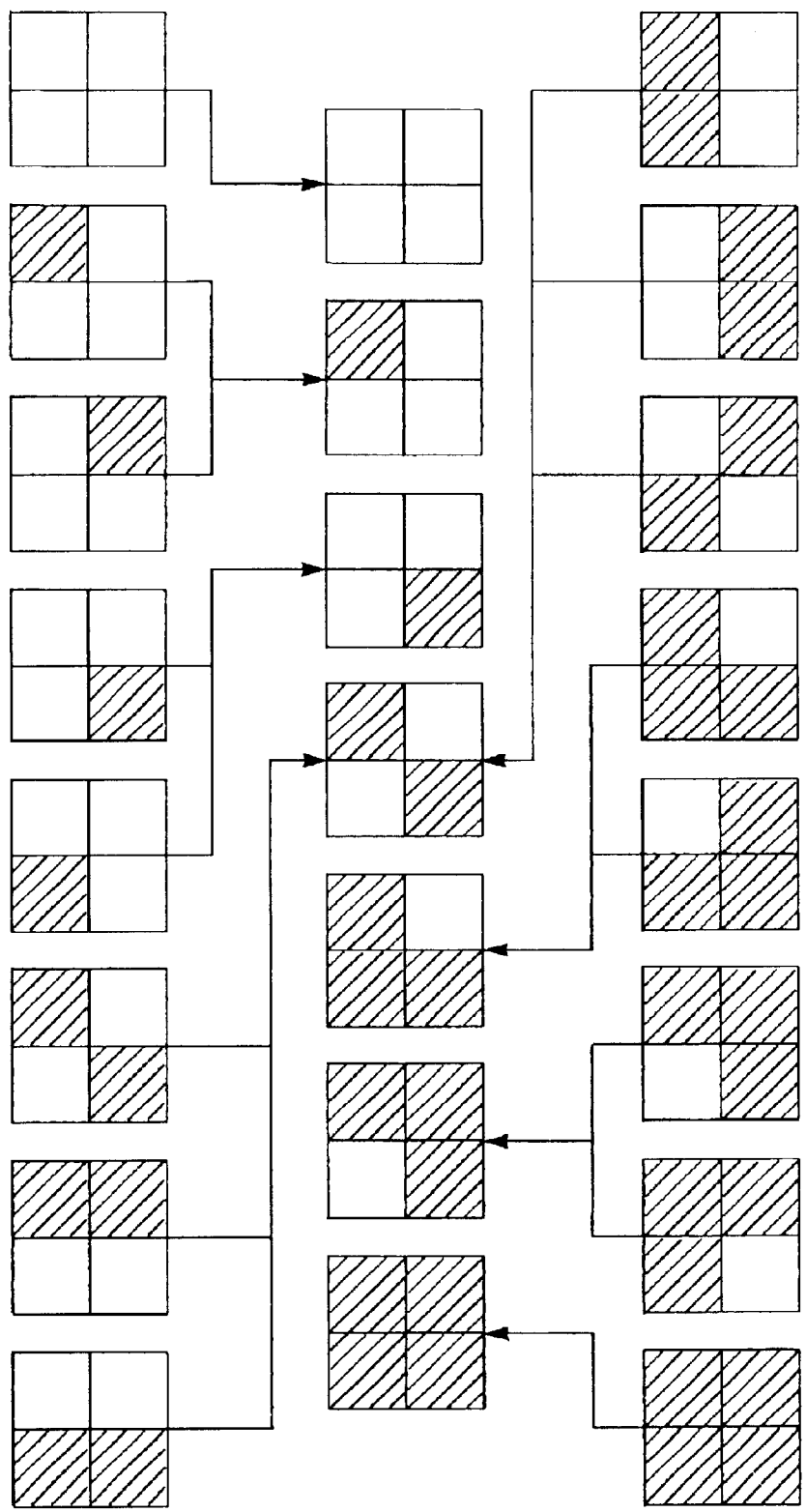
FIG. 2 shows a method of reducing the patterns of two-pixel-by-two-pixel monochrome digital halftone cells.

FIG. 2 shows sixteen possible patterns for each two-pixel-by-two-pixel halftone cell in columns 1 & 3. Seven allowed patterns of the preferred embodiment of the present invention are shown in column 2 as a result of a reduction method.

Figure 3:
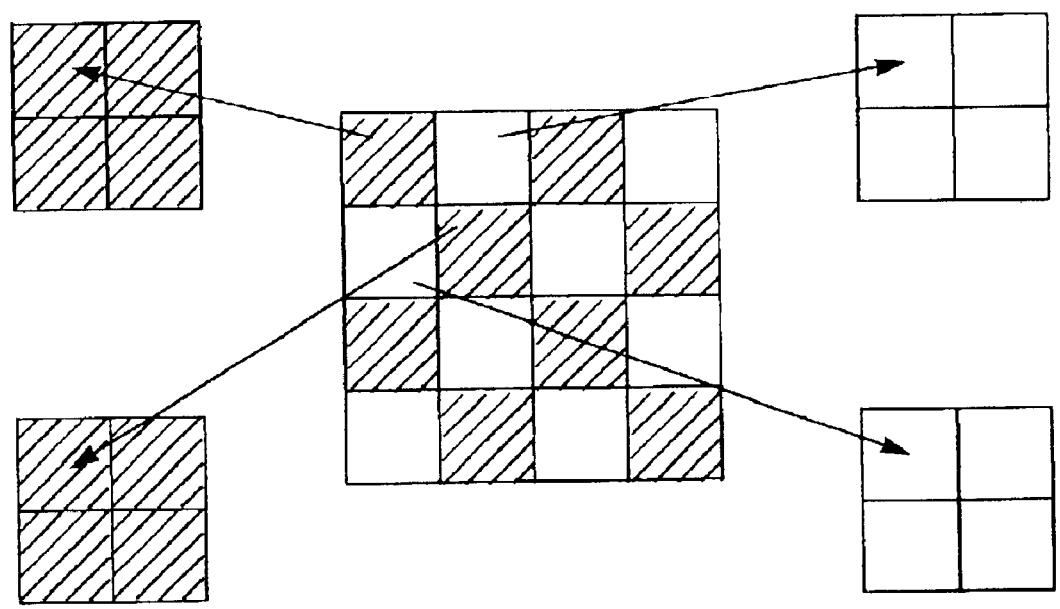
FIG. 3 shows a method of parsing the revised input bitmap.

FIG. 3 shows a four-pixel-by-four-pixel section of a larger image in the center of the drawing. The four two-pixel-by-two-pixel halftone cells within are parsed into the four smaller bitmap sections on either side.

Figure 4A:
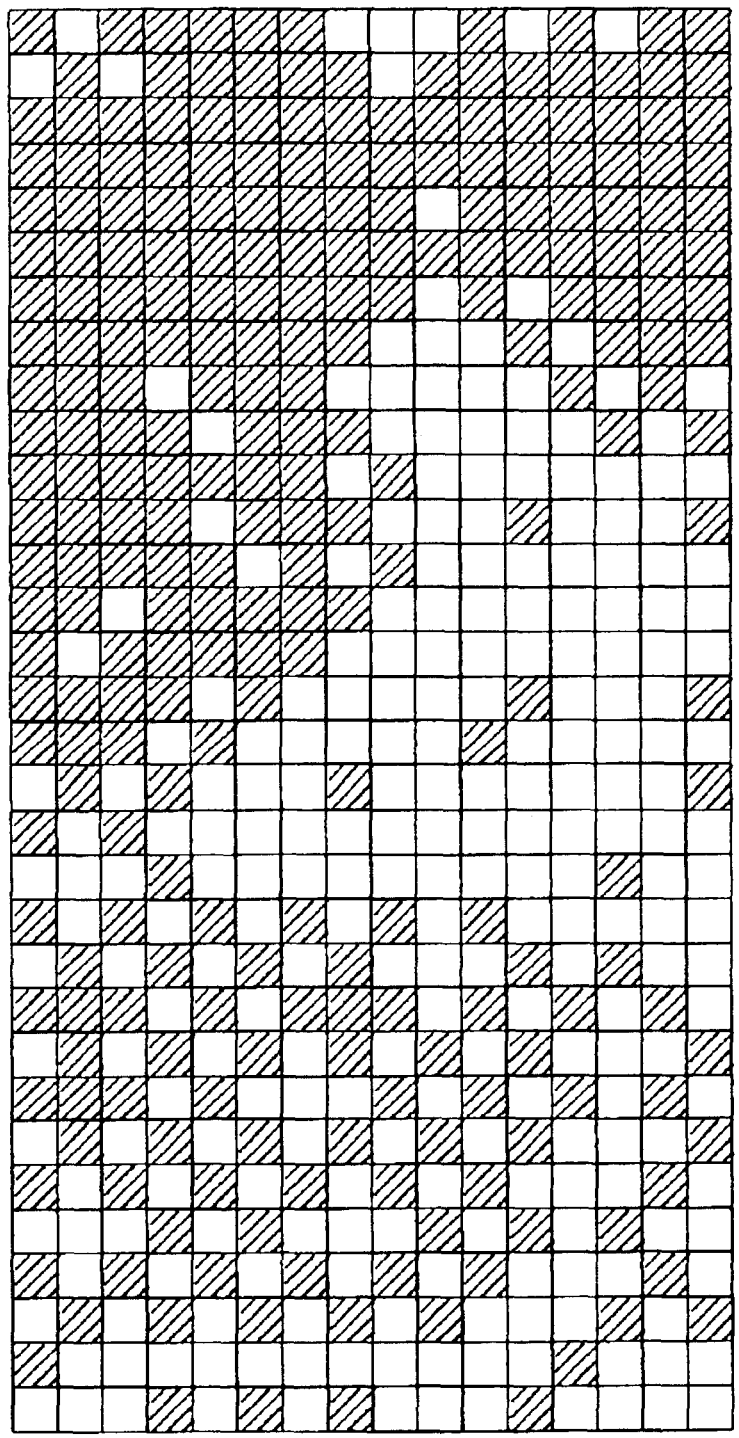
FIG. 4A shows an input bitmap in which the patterns of the two-pixel-by-two-pixel cells have been reduced.

FIG. 4A shows a section of a Monochrome Input Bitmap that has had its two-pixel-by-two-pixel cell patterns reduced. This Revised Input Bitmap is 512 pixels of dimensions 16 pixels wide and 32 pixels high. This Revised Input Bitmap is identical to a derived Revised Output Bitmap (FIG. 1).

Figure 4B:
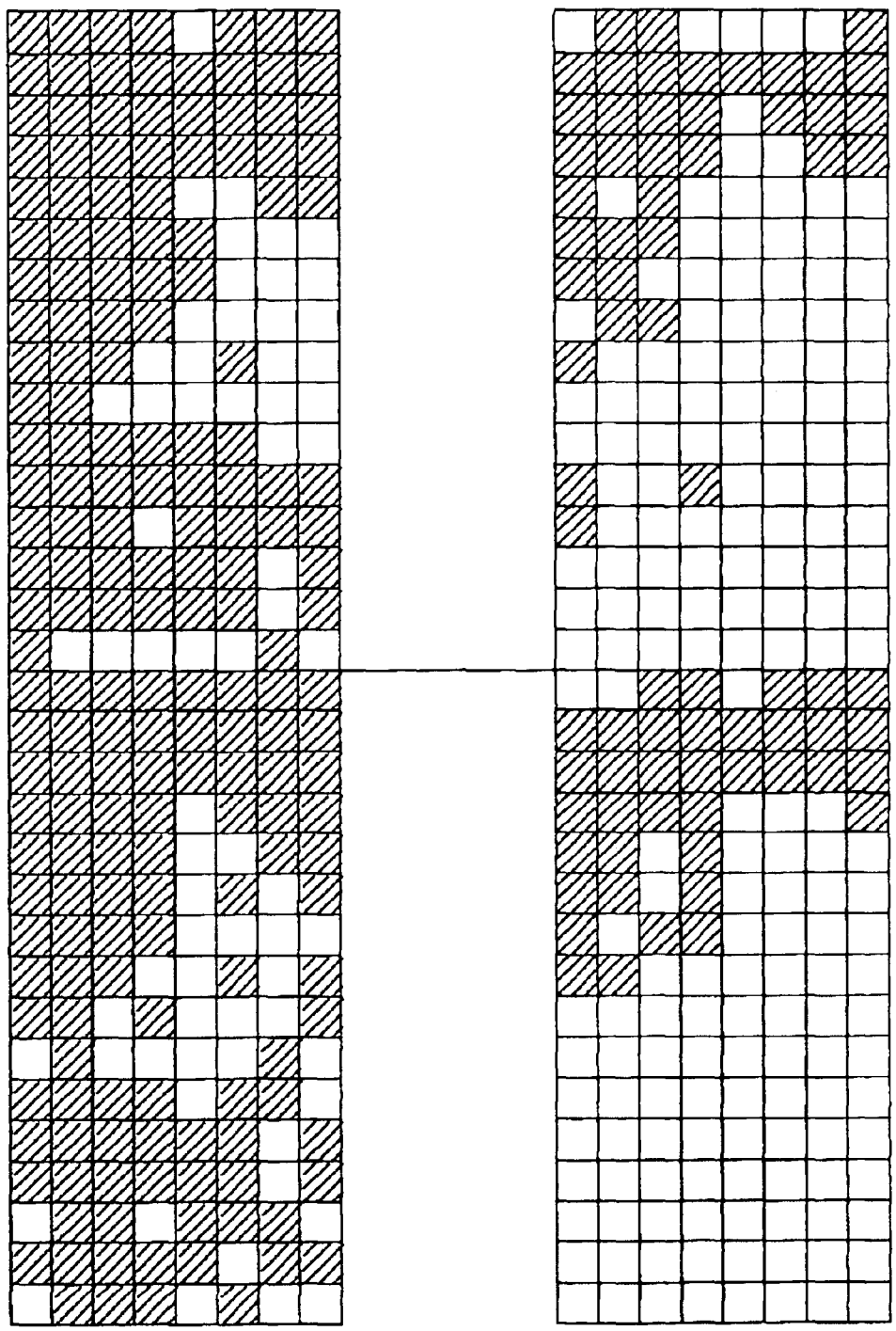
FIG. 4B shows the input bitmap of 4A parsed into smaller bitmaps that have been recombined.

FIG. 4B shows this Revised Input Bitmap (FIG. 4A) parsed into four smaller bitmaps that have been combined to derive a Parsed Input Bitmap. This bitmap is 512 pixels of dimensions 8 pixels wide and 64 pixels high. For the purpose of illustration, the image has been halved and the upper half shown on the left, the lower half shown on the right. This Parsed Input Bitmap is identical to a derived Parsed Output Bitmap (FIG. 1).

Figure 5:
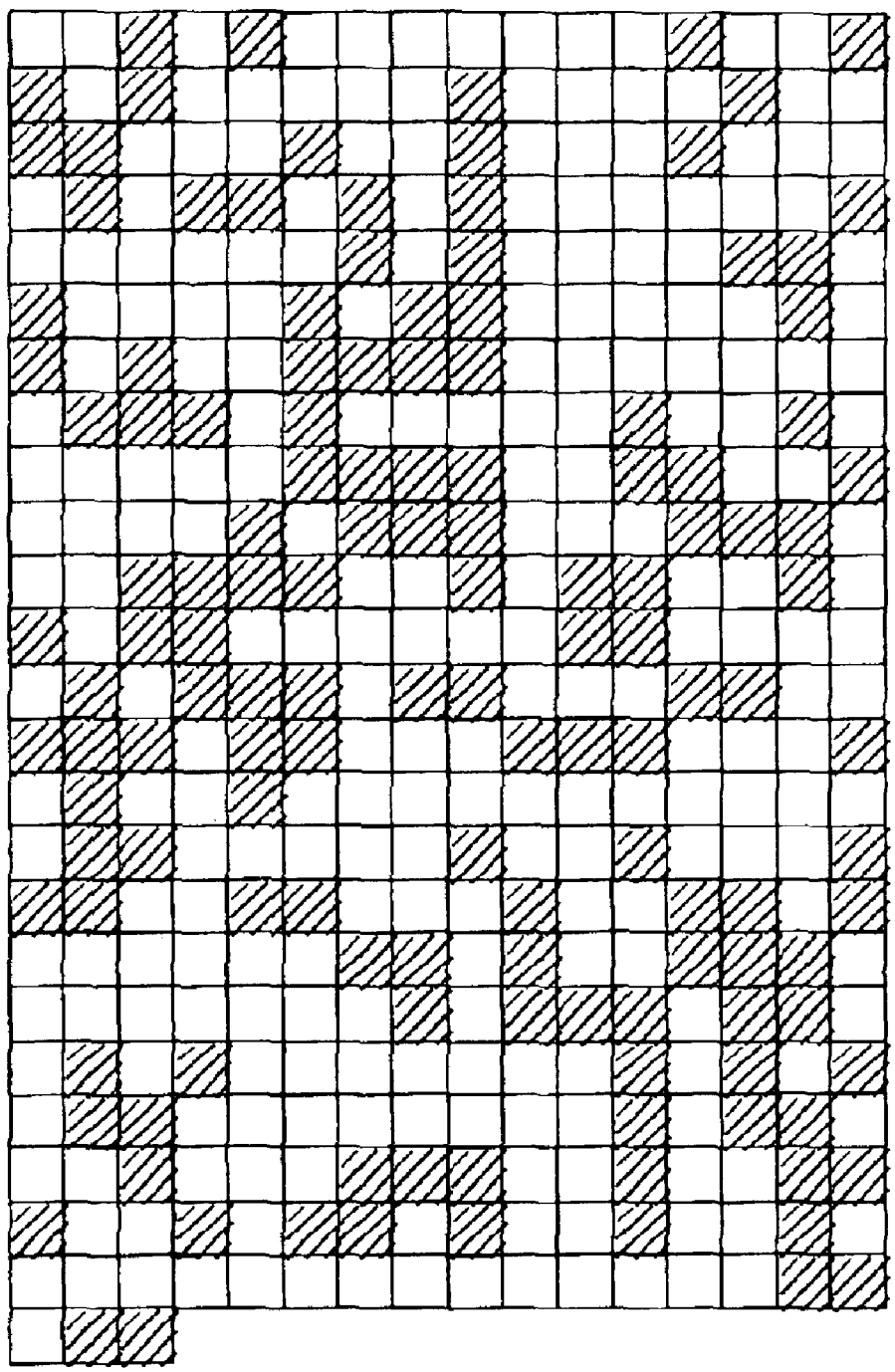
FIG. 5 shows a compressed bitmap created by converting the parsed input bitmap of 4B utilizing the preferred embodiment of the method of the invention.

FIG. 5 shows a Compressed File derived from the Parsed Input Bitmap (4B) following processing by the NOTA Coder utilizing a Fibonacci sequence to encode run length. It is a binary file of 387 bits expressed as a bitmap of 387 pixels, shown 16 pixels wide for comparison with the Revised Input Bitmap (FIG. 4A).

Alternative Embodiment

Figure 6:
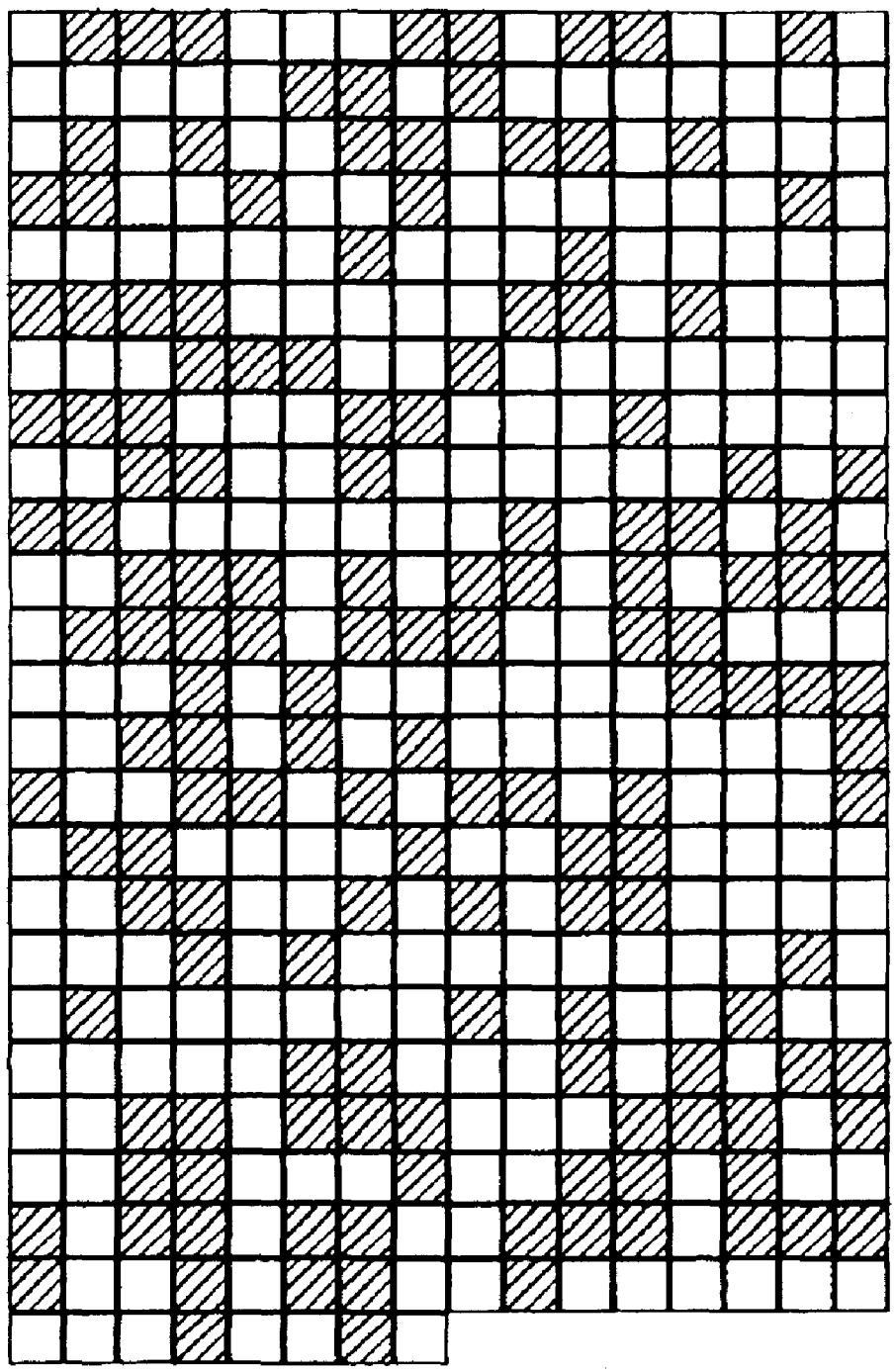
FIG. 6 shows a compressed bitmap created by converting the parsed input bitmap of 4B utilizing an alternative embodiment of the method of the invention.

FIG. 6 shows a Compressed File derived from the Parsed Input Bitmap (4B) following processing by the NOTA Coder utilizing an alternative sequence to determine run length. It is a binary file of 392 bits expressed as a bitmap of 392 pixels, shown 16 pixels wide for comparison with the Revised Input Bitmap (FIG. 4A). In this embodiment, a series based on an 8-bit byte is utilized (1, 2, 5, 8. 16, 24 . . . )

Advantages

From the description above, a number of advantages of my none-of-the-above digital halftone compression and decompression become evident.

(a) The actual size of the resultant encoded and compressed binary file is smaller than the size of the original monochrome bitmap file upon which it is based.

(b) Due to this reduction in size, the resultant file may be stored and transmitted more efficiently than the original file by using a binary computer.

(c) Unencoding and decompressing the resultant file provides a faithful reproduction of the revised input monochrome bitmap file.

(d) The none-of-the-above encoding and decoding method efficiently uses fewer resources of the binary computer system.

Operation

The subject of the operation of the current invention is an image expressed as a Monochrome Input Bitmap (FIG. 1). This bitmap is of specified dimensions expressed in pixels wide and high. These dimensions wholly accommodate a number of equal-sized multi-pixel halftone cells completely within. Each pixel within this bitmap is one of two "colors," normally white or black, and may be designated by a single binomial, 1 or 0.

The smallest square digital halftone cell capable of depicting shades of gray measures two-pixels-by-two-pixels. While said cell may convey five shades, all pixels black plus the incremental addition of four white pixels, the number of possible patterns within the cell numbers sixteen. A method of the present invention is to reduce the number of allowed patterns within the two-pixel-by-two-pixel cells.

Operation—Pattern Reduction

In FIG. 2, the sixteen possible patterns within a two-pixel-by-two-pixel cell are shown in the first and third columns. The reduction method's seven patterns are shown in the second column. The pattern of four pixels white (column 1, row 1) does not change (column 2, row 1). The pattern for four pixels black (column 3, row 8) also does not change (column 2, row 7). The six possible patterns for two pixels white and two pixels black shown in column 1, rows 6–8 & column 3, rows 1–3, all are assigned to one allowed checkerboard pattern (column 2, row 4).

The four possible patterns for three pixels white, one pixel black (column 1, rows 2–5), are assigned to two allowed patterns (column 2, rows 2 & 3) by shifting the single black pixel horizontally as necessary to partially maintain the checkerboard pattern. The four possible patterns for one pixel white, three pixels black (column 3 rows 4–7), similarly are assigned to two allowed patterns (column 2, rows 5 & 6) by shifting the single white pixel horizontally as necessary to partially maintain the checkerboard pattern (Note that the derived four patterns also may be created by moving the required pixels vertically and that the checkerboard pattern also may be the inverse.)

Once all the two-pixel-by-two-pixel cells similarly are processed, the Revised Input Bitmap (FIG. 1) is the same dimensions in pixels high and wide as its predecessor and the total number of black pixels and the total number of white pixels remains the same globally. FIG. 4A shows such a Revised Input Bitmap of dimensions 16 pixels wide by 32 pixels high with only seven patterns allowed for each two-pixel-by-two-pixel cell. A method of the present invention is to parse this bitmap to achieve longer runs of all black or all white.

Operation—Parsing

This revised bitmap now is processed to yield several smaller bitmaps which are recombined into a Pared Input Bitmap (FIG. 1.) Within each two-pixel-by-two-pixel cell, each of the four monochrome pixels is reassigned to one of four smaller bitmaps of specific dimensions half of the pixels wide and half of the pixels high of the preceding bitmap. Globally, all of the two-pixel-by-two-pixel cells' upper left pixels are grouped, all of the cells' lower right pixels are grouped, all of the cells' upper right pixels are grouped, and all of the cells' lower right pixels are grouped.

FIG. 3 shows a method of transferring the pixels of each two-pixel-by-two-pixel cell of the input bitmap into one of four parsed bitmaps which are then combined to create the Parsed Input Bitmap. Four two-pixel-by-two-pixel cells of the Revised Input Bitmap are shown in the center of FIG. 3. In each cell, the upper left pixel is transferred to the smaller bitmap in the upper left of FIG. 3, maintaining its relative position to similarly positioned pixels in adjoining cells. The lower right pixel of each cell similarly is transferred to the smaller bitmap in the lower left of FIG. 3. The upper right pixel of each cell and the lower left pixel of each cell similarly is transferred to the smaller bitmaps in the upper right and lower left, respectively, of FIG. 3. Note that the checkerboard pattern depicted will yield two all black bitmaps and two all white bitmaps.

The four parsed files now are arranged sequentially in a file that may be visualized as a bitmap of dimensions half the number of pixels wide and twice the number of pixels high as the original input bitmap. Again, the global relationship of white to black pixels remains constant. FIG. 4B depicts such a Parsed Input Bitmap of dimensions 8 pixels wide by 64 pixels high derived from the Revised Input Bitmap in FIG. 4A Note that for positioning on the page, the image has been halved with the upper half (of dimensions 8 pixels wide by 32 pixels high) on the left and the lower half (of dimensions 8 pixels wide by 32 pixels high) on the right. A method of the present invention is to encode this bitmap to create a compressed file.

Operation—Encoding

This Parsed Input Bitmap (FIG. 1) then is processed by a "none-of-the-above" or NOTA method designated as NOTA Coder (FIG. 1). In this method, variable length binomials representing runs of all of one "color" are triggered sequentially by one of the immediately preceding binomial's permutations. Similar to the use of "none of the above" as an answer to a multiple choice question, said permutation instead of designating a run length indicates that the actual run-length is not among those possible within that particular binomial, but is among those possible within a subsequent binomial.

Observing the first run's color and length in FIG. 4B, note that it is black and four pixels long. (From this point forward it is assumed that the next successive run is the opposite color or white, and that each of the following successive runs will alternate in color.)

The smallest possible run is one pixel long. The smallest possible binomial that may depict such a run is one bit in length. Said one bit may depict two states, designated by one or zero. In this method, one of the states is the "none-of-the-above" designation which means that the current binomial does not contain the actual run-length and the next successive binomial must be examined. The second state is the actual run length which acts as a signal to start over again with the smallest possible binomial.

The size of the variable length binomials triggered by the NOTA state may be designated by any consecutive series of numbers. The preferred embodiment utilized in FIG. 5 is the well-known Fibonacci order in which the next successive number in the series is created by summing the previous two numbers in the series. Beginning with a nominal 0 and the first actual number of the series as a 1, the second series number is 1, the third 2, the fourth 3, the fifth 5, the sixth 8, and so on.

Operation—Coding a Run

Taking the first black run of four pixels in FIG. 4B, a variable-length binomial is created that contains it. The run is greater than the run of 1 pixel that may be contained in the first Fibonacci-length binomial of 1 bit. Thus the first position of the variable length binomial is designated 0 which means "none of the above contained runs (1 pixel), go on to the next binomial in the series". The run of four also is greater than the run of 2 pixels that may be contained in the second Fibonacci-length binomial of 1 bit. Thus the second position of the variable length binomial is designated 0 which means "none of the above contained runs (2 pixels), go on to the next binomial in the series."

Now, however, the run of four is contained in the third Fibonacci-length binomial of 2 bits. Thus the third and fourth positions of the variable length binomial are designated 10 (containing a 1), which means "the second of the contained runs (3, 4, or 5 pixels), start over." The run of four is thus designated by a four place binomial: 0010. A Compressed File equal in pixel width to the Revised Input Bitmap in FIG. 4A (16 pixels) is shown in FIG. 5 as a bitmap in which a bit designated 0 is white and a bit designated 1 is black. The first four places in said file being 0010 are displayed as white-white-black-white, Operation—Coding the Following Runs Taking the next white run of one pixel in FIG. 4B, a variable length binomial is created which contains it. The run of one is contained in the first Fibonacci-length binomial of 1 bit. Thus the first position of the variable length binomial is designated 1 which means "the contained run (1), start over." The run of one is thus designated by the single place binomial of 1. In FIG. 5, the next place (after the first 4-place binomial) being 1 is displayed as black.

Taking the next black run of 31 pixels in FIG. 4B, a variable length binomial is created which contains it. The run of 31 is greater than the run of 1 pixel that may be contained in the first Fibonacci-length binomial of 1 bit. Thus the first position of the variable length binomial is designated 0 which means "none of the above contained runs (1 pixel), go on to the next binomial in the series." The run of 31 also is greater than the run of 2 pixels that may be contained in the second Fibonacci-length binomial of 1 bit. Thus the second position of the variable length binomial is designated 0 which means "none of the above contained runs (2 pixels), go on to the next binomial in the series."

The run of 31 is greater than the runs of 3–5 pixels that may be contained in the next Fibonacci-length binomial of 2 bits. Thus the third and fourth positions of the variable length binomial are both designated 0 which means "none of the above contained runs (3–5 pixels), go on to the next binomial in the series." The run of 31 also is greater than the runs of 6–12 pixels that may be contained in the next Fibonacci-length binomial of 3 bits. Thus the fifth, sixth and seventh positions of the variable length binomial are each designated 0 which means "none of the above contained runs (14 12 pixels), go on to the next binomial in the series."

The run of 31, however, is contained in the next Fibonacci-length binomial of 5 bits. Thus the ninth through thirteenth positions of the variable length binomial are designated 10011 (containing a 1) which means "one of the contained runs (31 pixels), start over." The run of 31 thus is designated by a 12 place binomial: 0000 0001 0011. In FIG. 5 the next 12 places (after the first 4-place binomial and the second 1-place binomial) being 0000 0001 0011 is displayed as 7 white, 1 black, 2 white, and 2 black.

The remaining portion of FIG. 4B is converted in the same manner until the Compressed File in FIG. 5 is completely processed. Comparing FIG. 4A to FIG. 5, note that a file of 512 bits has been converted into a file of 387 bits, a reduction in size of 24.4%. This file may be further compressed using the same or any other compression method. The resulting reduced-size file now may be stored or transmitted more efficiently. A method of the present invention is to decode this file.

Operation—Decoding a Run

Upon retrieval of s file, each encoding step is sequentially reversed To recreate FIG. 4B from FIG. 5, the NOTA process is reversed, designated as Nota Decoder (FIG. 1). In FIG. 5, this time taking the file's last three runs and their variable length binomials of 4, 2 and 20 places, 26 places are counted back to a start position The first place from this start point, 1 bit, is white, 0, meaning "a run greater than 1, take the next binomial." The next Fibonacci-length binomial, 1 bit, is white, 0 meaning "a run greater than 2, take the next binomial." The next binomial, 2 bits, contains at least one black pixel, a 1, meaning "the run is contained within, start over." The 2 place binomial is black-white, 10, which means a run of 4 (colored white as designated by the previous run, not shown.) This is the third from the last run of 4 white pixels in FIG. 4A.

Operation—Decoding the Following Runs

In FIG. 5, the next binomial place, 1 bit, is white, a 0, meaning "a run greater than 1, take the next binomial." The next binomial, 1 bit, contains one black pixel, a 1, meaning a run of 2, start over." This is the second from the last run of 2 black pixels in FIG. 4A.

In FIG. 5, the next binomial place, 1 bit is white, a 0, meaning "a run greater than 1, take the next binomial." The next binomial place, 1 bit, is white, a 0, meaning "a run greater than 2, take the next binomial." The next binomial places, 2 bits, are both white, 00, meaning a run greater than 5, take the next binomial. "The next binomial places, 3 bits, are all white, 000, meaning a run greater than 12, take the next binomial." The next binomial places, 5 bits, are all white, 00000, meaning a run greater than 43, take the next binomial. "The next binomial places, 8 bits, contain at least one black pixel, a 1, meaning the run is contained within, start over." The combined 20-place binomial is 0000 0000

0000 0001 1011, meaning a run of 70. This is the last run of 70 white pixels in FIG. 5.

As shown in FIG. 1, after all of the Compressed File has been similarly processed with the Nota Decoder, the resulting bitmap will be an exact duplicate of the Parsed Input Bitmap which is now redesignated the Parsed Output Bitmap (FIG. 4B). Please note that it is 512 pixels in the same dimensions of 8 pixels wide by 64 pixels high and maintains the same number of black and white pixels in the same relative positions.

Operation—Recombining the Parsed File and Sending to a Display Device

Also as shown in FIG. 1, this file then is processed by reversing the parsing method previously used. Each pixel of the Parsed Output Bitmap is reassigned to its original position in the Revised Input Bitmap now redesignated the Revised Output Bitmap (FIG. 4A). Note that it is 512 pixels in the same dimensions of 16 pixels wide by 32 pixels high and maintains the same number of black and white pixels in the same relative positions.

This file then is displayed either on a personal computer screen or by a printer, designated as Screen or Printer Display (FIG. 1). Please note that the above method does not recreate the Monochrome Input Bitmap (FIG. 1) with its two-pixel-by-two-pixel cells' sixteen patterns. Additionally, the invention's use of a Fibonacci series of successively larger binary numbers to contain run-lengths is only one of numerous possible methods of generating such a number series.

Conclusion, Ramifications and Scope

Accordingly, the reader will see that the none-of-the above method of this invention more efficiently compresses and decompresses a revised monochrome bitmap file. In addition, the method produces a compressed binary tile that more efficiently may be stored and transmitted between digital computing devices. And, the method faithfully reproduces the revised input monochrome bitmap file for accurate display on a digital computer monitor or printer.

By using one permutation of a variable-length binary number to designate the parameters of a successive monochrome color run and any of the remaining permutations to designate the actual run and a return to the smallest variable-length binary, conservation of available resources of a binary computer relative to processing, storage and transmission is achieved. Such conservation relies on the method of this invention including the revision of the input monochrome bitmap and the parsing of the revised binary bitmap file to promote longer runs. The resulting compressed file results in a demonstrated saving over the size of the input file.

Although the description above contains many specificities, those should not be construed as limiting the scope of the invention but as merely providing illustration of some of the presently preferred embodiments of this invention.

Thus the scope of the invention should be determine by the appended claims and their legal equivalents, rather than by the examples given.

I claim:

1. A method for compressing and decompressing a digital halftone monochrome bitmap comprising the steps of:
   (a) obtaining an input digital halftone monochrome bitmap of dimensions in pixels high and wide such that a plurality of equal-sized multi-pixel halftone cells are wholly contained,
   (b) reducing the possible patterns of monochrome pixels within said halftone cells by shifting certain pixels either horizontally or vertically according to a master grid based on a checkerboard pattern,
   (c) parsing said revised halftone cells into individual files, one each for each pixel position within the cell,
   (d) recombining said files into a single file,
   (e) encoding said single file's alternating runs of two monochrome colors with variable-length binary numbers within which all but one binary permutation may designate the length of the run and a return to start, and one binary permutation designates none of the contained run-lengths and to move on to larger successive binary numbers,
   (f) generating the increasing sizes of said successive run-length-containing variable-length binary numbers by a plurality of means, including Fibonacci numbers, byte-length-based numbers, or other means based on efficiency,
   (g) generating a compressed file of fewer bits than the input bitmap by utilizing steps (a)–(f),
   (h) reversing said method in steps (b)–(g) until said compressed file is uncompressed to replicate the said reduced pattern bitmap,
   (i) displaying said bitmap on a computer printer or monitor.

* * * * *